United States Patent
Lee et al.

(10) Patent No.: US 10,068,079 B2
(45) Date of Patent: Sep. 4, 2018

(54) BIOMETRIC AUTHENTICATION DEVICE AND BIOMETRIC IMAGE OUTPUT CONTROL METHOD

(71) Applicant: Suprema HQ Inc., Gyeonggi-do (KR)

(72) Inventors: Hyeonchang Lee, Seongnam-si (KR); Hochul Shin, Seongnam-si (KR); Kideok Lee, Seongnam-si (KR); Jae Won Lee, Seongnam-si (KR); Bong Seop Song, Seongnam-si (KR)

(73) Assignee: SUPREMA HQ INC., Seongnamsi (KR)

( * ) Notice: Subject to any disclaimer, the term of this patent is extended or adjusted under 35 U.S.C. 154(b) by 114 days.

(21) Appl. No.: 14/982,628

(22) Filed: Dec. 29, 2015

(65) Prior Publication Data

US 2016/0188860 A1     Jun. 30, 2016

(30) Foreign Application Priority Data

Dec. 29, 2014 (KR) .................. 10-2014-0192292

(51) Int. Cl.
*G06F 21/32* (2013.01)
*G06K 9/00* (2006.01)

(52) U.S. Cl.
CPC ......... *G06F 21/32* (2013.01); *G06K 9/00255* (2013.01); *G06K 9/00288* (2013.01); *G06K 9/00912* (2013.01)

(58) Field of Classification Search
USPC ........................................................ 726/18
See application file for complete search history.

(56) References Cited

U.S. PATENT DOCUMENTS

| | | | | | |
|---|---|---|---|---|---|
| 4,969,006 | A | * | 11/1990 | Ishibashi | G02B 7/34 396/104 |
| 6,937,135 | B2 | * | 8/2005 | Kitson | G06F 21/32 340/5.4 |
| 7,598,997 | B2 | * | 10/2009 | Shiraishi | H04N 5/23212 348/353 |
| 7,751,701 | B2 | * | 7/2010 | Endo | G03B 13/34 348/347 |

(Continued)

FOREIGN PATENT DOCUMENTS

| JP | 2000-131598 | 5/2000 |
|---|---|---|
| KR | 10-2000-0050494 | 8/2000 |

*Primary Examiner* — Taghi Arani
*Assistant Examiner* — Badri Champakesan
(74) *Attorney, Agent, or Firm* — Brinks Gilson & Lione

(57) ABSTRACT

A biometric image output control method in a biometric authentication device comprises the step of generating a biometric image by imaging an living body to be authenticated; determining whether an imaging environment; if the imaging environment satisfies a predetermined recognition condition, controlling a change rate of a size of a biometric image, a change rate of a focal point of the biometric image and a change rate of a brightness of the biometric image according to a distance to the living body to be authenticated; and if the imaging environment does not satisfy the predetermined recognition condition, overly controlling at least one of the change rate of the size of the biometric image, the change rate of the focal point of the biometric image and the change rate of the brightness of the biometric image according to the distance.

8 Claims, 5 Drawing Sheets

(56) References Cited

U.S. PATENT DOCUMENTS

| | | | | |
|---|---|---|---|---|
| 8,712,111 B2* | 4/2014 | Otsuka | G06T 11/60 | 382/107 |
| 8,787,624 B2* | 7/2014 | Hama | G06K 9/036 | 382/115 |
| 9,152,868 B2* | 10/2015 | Smowton | H04L 9/3231 | |
| 9,412,014 B2* | 8/2016 | Aoki | G06K 9/00382 | |
| 9,438,591 B2* | 9/2016 | Hama | G06K 9/00087 | |
| 9,596,407 B2* | 3/2017 | Saito | H04N 5/232 | |
| 9,667,856 B2* | 5/2017 | Hamada | H04N 5/23209 | |
| 2005/0168620 A1* | 8/2005 | Shiraishi | H04N 5/23212 | 348/345 |
| 2007/0197261 A1* | 8/2007 | Humbel | G06Q 30/00 | 455/558 |
| 2008/0045806 A1* | 2/2008 | Keppler | A61B 5/0002 | 600/300 |
| 2008/0143866 A1* | 6/2008 | Nakahara | H04N 5/23212 | 348/345 |
| 2008/0152198 A1* | 6/2008 | Tsukahara | G06K 9/00604 | 382/117 |
| 2008/0163536 A1* | 7/2008 | Koch | F41A 17/066 | 42/111 |
| 2008/0172725 A1* | 7/2008 | Fujii | G06F 21/32 | 726/5 |
| 2009/0046903 A1* | 2/2009 | Corcoran | G06K 9/00046 | 382/124 |
| 2010/0008545 A1* | 1/2010 | Ueki | G06K 9/00033 | 382/115 |
| 2012/0110669 A1* | 5/2012 | Beresnevichiene | G06F 21/577 | 726/25 |
| 2012/0293642 A1* | 11/2012 | Berini | G06F 21/32 | 348/77 |
| 2013/0215275 A1* | 8/2013 | Berini | G06F 21/32 | 348/150 |
| 2013/0258086 A1* | 10/2013 | Erhart | H04N 5/23219 | 348/77 |
| 2013/0259321 A1* | 10/2013 | Aoki | G06K 9/00885 | 382/115 |
| 2014/0168273 A1* | 6/2014 | Chen | G09G 5/00 | 345/660 |
| 2014/0376784 A1* | 12/2014 | Aoki | G06K 9/00013 | 382/115 |
| 2015/0180866 A1* | 6/2015 | Hama | G06K 9/00087 | 726/6 |

* cited by examiner

BIOMETRIC AUTHENTICATION DEVICE AND BIOMETRIC IMAGE OUTPUT CONTROL METHOD

CROSS-REFERENCE TO RELATED APPLICATIONS

This application claims priority to Korean Patent Application No. 10-2014-0192292, filed on Dec. 29, 2014, the disclosure of which is incorporated herein in its entirety by reference.

TECHNICAL FIELD

The present disclosure relates to a biometric authentication device and a biometric image output control method and, more particularly, to a method of controlling output of a biometric image of a living body to be authenticated.

BACKGROUND

As well-known in the art, there are many different biometric authentication methods such as a face authentication method, a fingerprint authentication method, an iris authentication method, a blood vessel authentication method and the like.

Among them, the face authentication method makes use of a lighting fixture and a camera for acquiring a face image and an image display device for displaying a face of a living body to be authenticated imaged by the camera.

In this face authentication method, the distance between the camera and the living body to be authenticated is an important factor for acquiring a face image effective for face authentication.

In a face authentication device according to a related art, a guide line is displayed on a screen of an image display device in order to guide a living body to be authenticated to a predetermined recognition distance. If a taken face image is displayed on the screen, a user adjusts the distance between the user and the camera so that a contour line of a face image displayed on the screen overlaps with the guide line as far as possible. Moreover, a message which instructs the user to come closer or go farther is visually displayed or verbally notified in order to guide a living body to be authenticated to a predetermined recognition distance.

As mentioned above, according to the related art, a biometric subject should make an effort to align his or her face with the guide line displayed on the screen. This poses a problem in that the biometric subject may feel obsessive.

Even if the face is aligned with the guide line, the distance from the camera to the biometric subject may vary depending on the size of the face of the biometric subject. In photography, the distance in front of and behind the subject that appears to be in focus is referred to as a depth of field (DOF). In the case of using a camera having a small depth of field, even if the face of a biometric subject is aligned with a guide line, optical blurring may occur in a face image due to the difference in the distance between the biometric subject and the camera.

Thus, according to the related art, face recognition performance may be reduced due to the failure of face recognition attributable to optical blurring or the like. The failure of face recognition may cause inconvenience to the biometric subject.

In the meantime, if an iris having a large aperture value is used in order to increase the depth of field, the amount of light accumulated per unit time in an image sensor of a camera decreases. This poses a problem in that a face image acquired becomes darker. If the exposure time of a camera is increased in order to solve this problem, motion blurring may be generated due to the motion of a biometric subject. After all, in order to solve the aforementioned problem, it is necessary to increase the number of lightings or to use a strong lighting.

However, the increase in the number of lightings may lead to an increase in the size of a face recognition device. Use of a strong lighting may adversely affect the eyes of a biometric subject and may cause great inconvenience to the biometric subject.

Accordingly, in order to prevent a decrease in the face recognition performance, it is necessary to suitably set the number of lightings, the brightness of lightings, the aperture value of a camera, and the exposure of a camera. It is preferred that the face of a user is positioned within a depth-of-field range which is a predetermined recognition distance that satisfies such a condition. As a consequence, it is most preferable that a biometric subject is positioned at a predetermined recognition distance.

SUMMARY

The present disclosure provides a biometric authentication device and a biometric image output control method which are capable of adaptively controlling the output characteristics of a biometric image depending on whether an imaging environment for a living body to be authenticated satisfies a predetermined recognition condition.

The problems to be solved by the present disclosure are not limited to the aforementioned ones. Other problems not referred to herein will be apparently understood from the following descriptions by a person having an ordinary knowledge in the field to which the present disclosure pertains.

According to one aspect of the present disclosure, there is provided a biometric image output control method in a biometric authentication device including a living body imaging unit. The biometric image output control method may comprise generating a biometric image by imaging a living body to be authenticated, determining whether an imaging environment for the living body to be authenticated satisfies a predetermined recognition condition, and if the imaging environment satisfies the predetermined recognition condition, controlling a change rate of a size of the biometric image, a change rate of a focal point of the biometric image, and a change rate of brightness of the biometric image according to a change of a distance from the living body imaging unit to the living body to be authenticated. Further, if the imaging environment does not satisfy the predetermined recognition condition, controlling at least one of the change rates of the size of the biometric image, of the focal point of the biometric image and of the brightness of the biometric image to be greater than change rates according to the distance.

According to one embodiment of the present disclosure, the output characteristics of a biometric image are adaptively controlled depending on whether an imaging environment for a living body to be authenticated satisfies a predetermined recognition condition. This enables an authentication target user to easily adjust an imaging environment such as a distance to a camera or the like in conformity with a predetermined recognition condition while confirming an output situation of a biometric image.

For example, in a face recognition process, a face recognition subject sets a predetermined distance by moving back and forth while observing his or her own face displayed on an image display device. At this time, the size of a face, the in-focus degree and the brightness of an image play an important role in enabling a user to visually recognize the current position of the user.

Accordingly, in one embodiment of the present disclosure, the variation width of the change rate of the size of the face, the in-focus degree and the image brightness is adjusted according to the change of the distance between the user and the camera. This enables the user to naturally and visually recognize a biometric distance and to rapidly move to a predetermined recognition distance.

DETAILED DESCRIPTION

Advantages, features and methods for achieving them will become apparent from the embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

Figure 1:
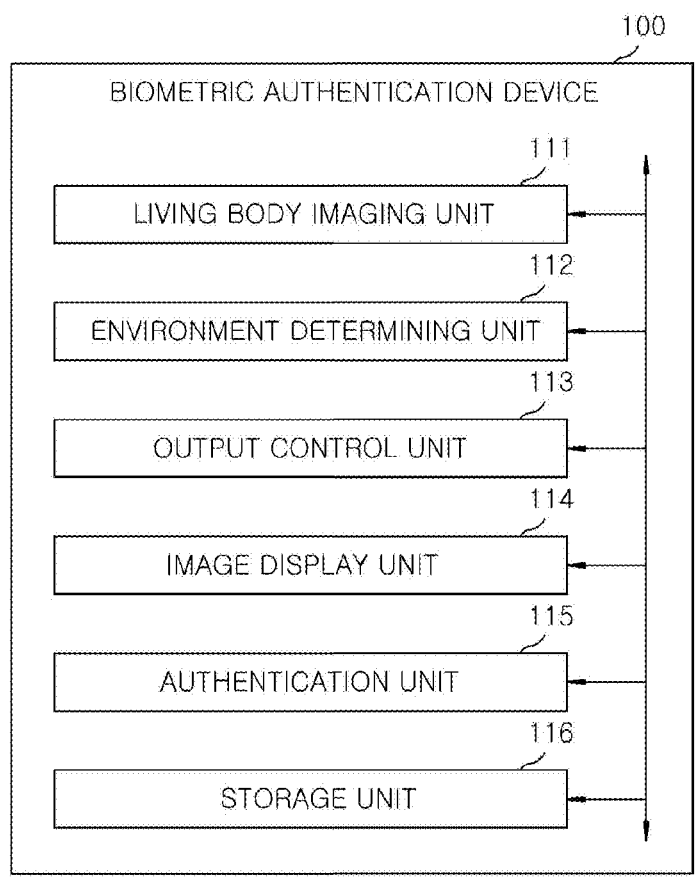
FIG. 1 is a block configuration view of a biometric authentication device according to one embodiment of the present disclosure.

FIG. 1 is a block configuration view of a biometric authentication device according to one embodiment of the present disclosure.

As illustrated in FIG. 1, the biometric authentication device 100 includes a living body imaging unit 111, an environment determining unit 112, an output control unit 113, an image display unit 114, an authentication unit 115 and a storage unit 116.

The living body imaging unit 111 generates a biometric image by imaging a living body to be authenticated. For example, the living body imaging unit 111 may generate a face image by imaging the face of a living body to be authenticated.

The environment determining unit 112 determines whether an imaging environment for a living body to be authenticated satisfies a predetermined recognition condition. In this regard, the environment determining unit 112 may determine that the predetermined recognition condition is satisfied if a distance from a camera of the living body imaging unit 111 to a living body to be authenticated falls within a predetermined recognition distance range. Alternatively, the environment determining unit 112 may determine that the predetermined recognition condition is satisfied if a focal point of a camera for imaging a living body to be authenticated falls within a predetermined focal point range. Alternatively, the environment determining unit 112 may determine that the predetermined recognition condition is satisfied if a brightness of a screen for displaying a biometric image falls within a predetermined brightness range.

If the determination results of the environment determining unit 112 reveal that the predetermined recognition condition is satisfied, the output control unit 113 controls a size of the biometric image, a focal point of the biometric image and a brightness of the biometric image according to the distance from the living body imaging unit 111 to a living body to be authenticated. In contrast, if the predetermined recognition condition is not satisfied, the output control unit 113 overly changes at least one of the size of the biometric image, the focal point of the biometric image, and/or the brightness of the biometric image. For example, if the determination results of the environment determining unit 112 reveal that the predetermined recognition condition is satisfied, the output control unit 113 may change the size of the biometric image in inverse proportion to the distance from the living body imaging unit 111 to the living body to be authenticated. If the determination results of the environment determining unit 112 reveal that the predetermined recognition condition is satisfied, the output control unit 113 may change the focal point of the biometric image according to the distance, e.g., in inverse proportion to the distance from the living body imaging unit 111 to the living body to be authenticated. If the determination results of the environment determining unit 112 reveal that the predetermined recognition condition is satisfied, the output control unit 113 may change the brightness of the biometric image according to the distance, e.g., in inverse proportion to the distance from the living body imaging unit 111 to the living body to be authenticated. In contrast, if the determination results of the environment determining unit 112 reveal that the predetermined recognition condition is not satisfied, the output control unit 113 may increase the change rate of at least one of the size, the focal point, and/or the brightness of the biometric image than the case where the predetermined recognition condition is satisfied.

The image display unit 114 outputs, as a screen, the biometric image generated by the living body imaging unit 111, in conformity with the output characteristics controlled by the output control unit 113.

The authentication unit 115 performs an authentication process by determining whether a living body to be authenticated is a right user based on a comparison result of a biometric image taken by the living body imaging unit 111 and an authentication image pre-registered in the storage unit 116.

The storage unit 116 pre-registers an authentication image so that the authentication unit 115 can compare the taken biometric image with the authentication image when performing the authentication process.

Figure 2:
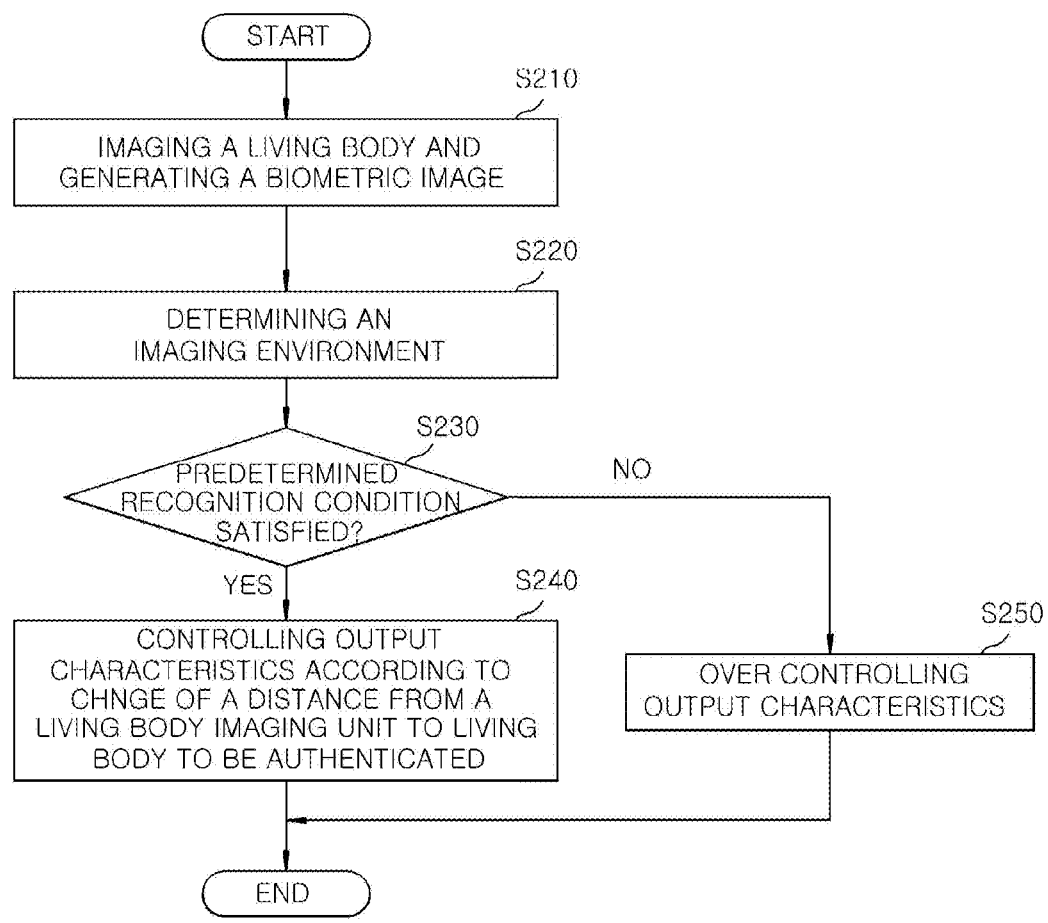
FIG. 2 is a flowchart for explaining a biometric image output control method performed by the biometric authentication device according to one embodiment of the present disclosure.

FIG. 2 is a flowchart for explaining a biometric image output control method performed by the biometric authentication device according to one embodiment of the present disclosure.

As illustrated in FIG. 2, the biometric image output control method according to one embodiment of the present disclosure includes a step (S210) of generating a biometric image by imaging a living body to be authenticated.

The biometric image output control method further includes a step (S220) of grasping an imaging environment for a living body to be authenticated and a step (S230) of determining whether the imaging environment satisfies a predetermined recognition condition.

The biometric image output control method further includes a step (S240) of, if the imaging environment satisfies the predetermined recognition condition, controlling a change rate of a size of the biometric image, a change rate of focal point of the biometric image, and/or a change rate of a brightness of the biometric image according to a distance to the living body to be authenticated.

The biometric image output control method further includes a step (S250) of, if the imaging environment does not satisfy the predetermined recognition condition, overly controlling at least one of a change rate of a size of the biometric image, a change rate of a focal point of the biometric image, and/or a change rate of a brightness of the biometric image according to the distance.

The biometric image output control method performed by the biometric authentication device 100 according to one embodiment of the present disclosure will now be described in more detail with reference to FIGS. 1 to 6.

First, the living body imaging unit 111 generates a biometric image by imaging a living body to be authenticated. For example, the living body imaging unit 111 includes a lighting and a camera. The living body imaging unit 111 may image the face of the living body to be authenticated through the camera while irradiating illumination light toward a space where the living body to be authenticated is positioned. In this regard, the lighting may be an infrared lighting or other lightings which give a reduced visual stimulus to a user. The camera may be a fixed-focus camera or a unifocal camera (S210).

Then, the environment determining unit 112 grasps an imaging environment for the living body to be authenticated to be image by the living body imaging unit 111 (220). The environment determining unit 112 determines whether the grasped imaging environment satisfies a predetermined recognition condition (S230).

In this regard, the environment determining unit 112 may determine that the predetermined recognition condition is satisfied if the distance from the camera of the living body imaging unit 111 to the living body to be authenticated falls within a predetermined recognition distance range. Alternatively, the environment determining unit 112 may determine that the predetermined recognition condition is satisfied if the focal point of the camera for imaging the living body to be authenticated falls within a predetermined focal point range. Alternatively, the environment determining unit 112 may determine that the predetermined recognition condition is satisfied if the brightness of a screen for displaying a biometric image falls within a predetermined brightness range.

For example, the living body imaging unit 111 may further include a distance measuring sensor in addition to the lighting and the camera. The distance measuring sensor may measure a distance to a living body to be authenticated and may provide the distance to the environment determining unit 112. If the camera is formed of a pair of an infrared camera and a visual camera, a distance to a living body to be authenticated may be measured using a well-known three-dimensional depth measuring method.

In the case where it is determined by the environment determining unit 112 that a current imaging environment satisfies a predetermined recognition condition, the output control unit 113 controls a change rate of a size of the biometric image, a change rate of a focal point of the biometric image, and/or a change rate of a brightness of the biometric image according to the distance to the living body to be authenticated (S240).

Figure 3:
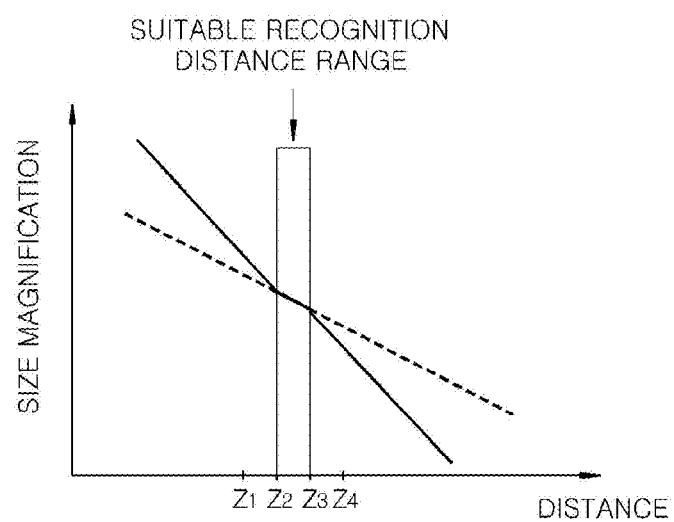
FIG. 3 is a graph which shows a change in a size of a biometric image according to a change of a distance in one embodiment of the present disclosure.

For example, referring to a graph illustrated in FIG. 3 which plots a change in a size of the biometric image according to a change of a distance, in a section between $Z_2$ and $Z_3$, the output control unit 113 changes, as indicated by a solid line, the size of the biometric image in inverse proportion to the distance to the living body to be authenticated.

Figure 4:
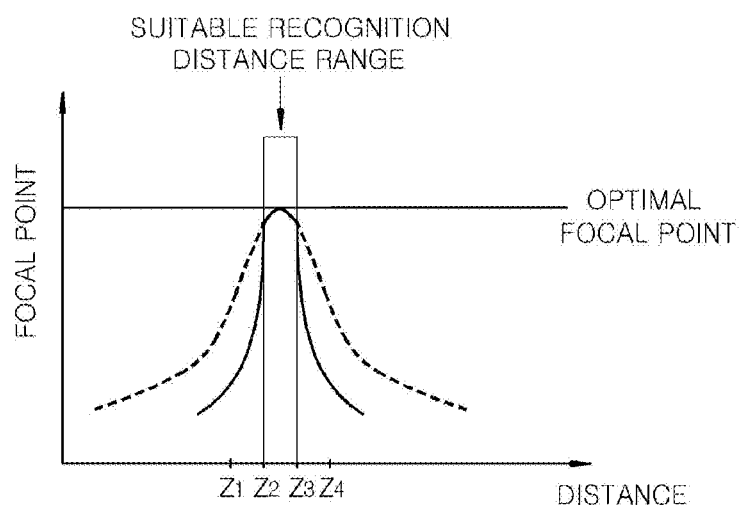
FIG. 4 is a graph which plots a change in focal point of a biometric image according to a change of a distance in one embodiment of the present disclosure.

Furthermore, referring to a graph illustrated in FIG. 4 which plots a change in a focal point of the biometric image according to a change of a distance, in a section between $Z_2$ and $Z_3$, the output control unit 113 changes, as indicated by a solid line, a focal point of the biometric image according to the distance to the living body to be authenticated.

Figure 5:
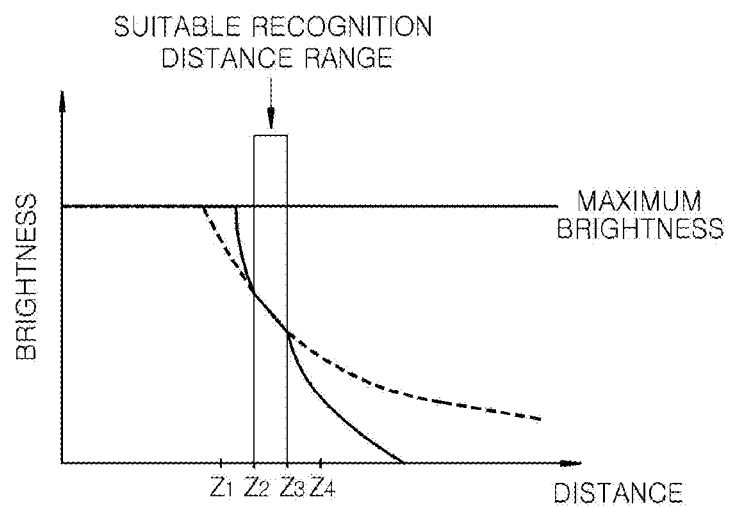
FIG. 5 is a graph which plots a change in a brightness of a biometric image according to a change of a distance in one embodiment of the present disclosure.

In addition, referring to a graph illustrated in FIG. 5 which plots a change in a brightness of the biometric image according to a change of a distance, in a section between $Z_2$ and $Z_3$, the output control unit 113 changes, as indicated by a solid line, a brightness of the biometric image, e.g., in inverse proportionate to the distance to the living body to be authenticated.

In this regard, the image display unit 114 outputs, on a screen, the biometric image generated by the living body imaging unit 111, in conformity with the output characteristics controlled by the output control unit 113. The living body face displayed on the image display unit 114 during the normal control is illustrated in an upper region in FIG. 6.

Figure 6:
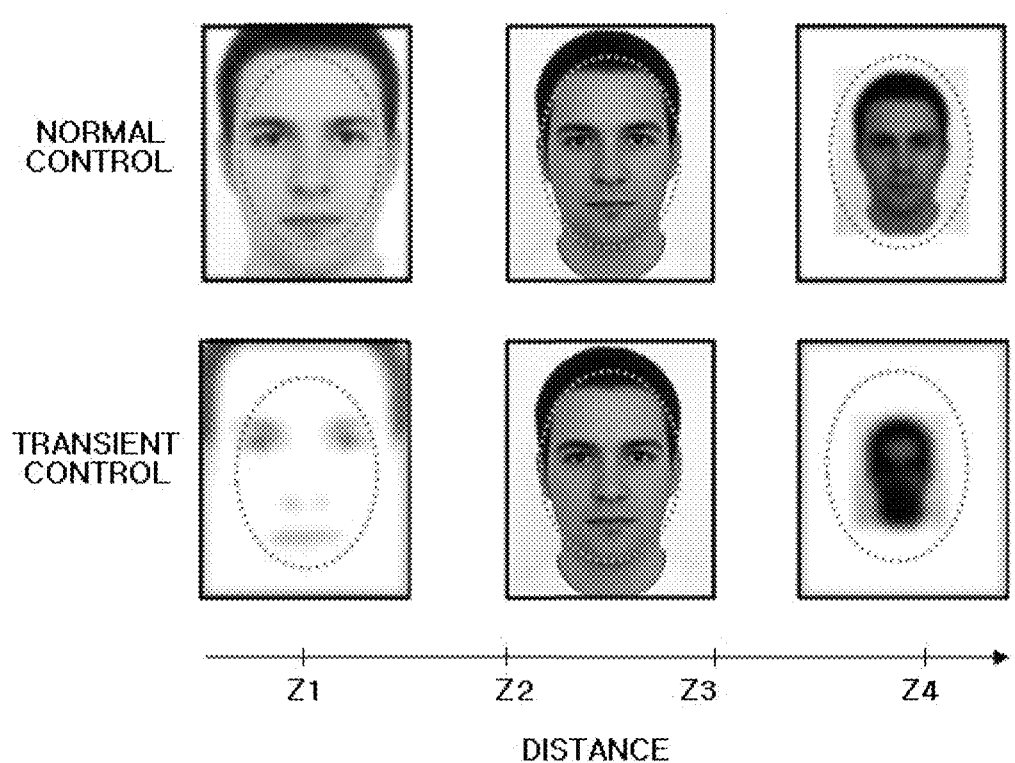
FIG. 6 is an exemplary view illustrating output images acquired in normal control and transient control according to one embodiment of the present disclosure.

Referring to FIG. 6, in a section between $Z_2$ and $Z_3$, the face of a living body to be authenticated has a predetermined size, a predetermined focal point, and/or a predetermined brightness. In this state, it is possible to accurately perform face recognition.

In the case where it is determined by the environment determining unit 112 that a current imaging environment does not satisfy a predetermined recognition condition, the output control unit 113 overly controls at least one of a change rate of a size of the biometric image, a change rate of a focal point of the biometric image and a change rate of a brightness of the biometric image brightness according to the distance to the living body to be authenticated (S250).

For example, referring to a graph illustrated in FIG. 3 which plots a change in a biometric image according to a change of a distance, in a section nearer than $Z_2$ and in a section farther than $Z_3$, the output control unit 113 overly controls, as indicated by a solid line, the change rate of the size of the biometric image according to the distance to the living body to be authenticated. At a distance of $Z_1$, the output control unit 113 sharply increases the size of the biometric image as if the living body to be authenticated is positioned closer than an actual position. At a distance of $Z_4$, the output control unit 113 sharply reduces the size of the biometric image as if the living body to be authenticated is positioned farther than an actual position. When performing normal control in the same sections, the output control unit 113 performs the normal control as indicated by a dotted line.

Furthermore, referring to a graph illustrated in FIG. 4 which plots a change in a biometric image according to a change of a distance, in a section nearer than Z2 and in a section farther than Z3, the output control unit 113 overly controls, as indicated by a solid line, a change rate of the focal point of the biometric image according to the distance to the living body to be authenticated. At a distance of Z1, the output control unit 113 blurs the focal point of the biometric image as if the living body to be authenticated is positioned closer than an actual position. At a distance of Z4, the output control unit 113 blurs the focal point of the biometric image as if the living body to be authenticated is positioned farther than an actual position. When performing normal control in the same sections, the output control unit 113 performs the normal control as indicated by a dotted line.

In addition, referring to a graph illustrated in FIG. 5 which plots a change in a biometric image according to a change of a distance, in a section nearer than $Z_2$ and in a section farther than $Z_3$, the output control unit 113 overly controls, as indicated by a solid line, a change rate of the brightness of the biometric image according to the distance to the living body to be authenticated. At a distance of $Z_1$, the output control unit 113 sharply increases the brightness of the biometric image as if the living body to be authenticated is positioned closer than an actual position. At a distance of $Z_4$, the output control unit 113 sharply reduces the brightness of the biometric image as if the living body to be authenticated is positioned farther than an actual position. When performing normal control in the same sections, the output control unit 113 performs the normal control as indicated by a dotted line.

In this regard, the image display unit 114 outputs, as a screen, the biometric image generated by the living body imaging unit 111, in conformity with the output characteristics controlled by the output control unit 113. The living body face displayed on the image display unit 114 during the transient control is illustrated in a lower region in FIG. 6.

In FIG. 6, there is illustrated an example where all the change rates of the size of the biometric image, of the focal point of the biometric image and of the brightness of the biometric image according to the distance to the living body to be authenticated are controlled at a location of $Z_1$ included in the section nearer than $Z_2$ and at a location $Z_4$ included in the section farther than $Z_3$. By comparing the over control images and the normal control images available at the locations $Z_1$ and $Z_4$, it is possible to know the differences between the over control images and the normal control images. In the case where a user observes his or her face outputted through the image display unit 114 at the locations $Z_1$ and $Z_4$, the user may more rapidly recognize the wrong position during the transient control than during the normal control.

In the meantime, an authentication image is pre-registered and stored in the storage unit 116 so that, when the authentication unit 115 performs an authentication process, the authentication image can be compared with the biometric image taken and generated at step S210. The authentication unit 115 performs the authentication process by determining whether the living body to be authenticated is a right user based on the comparison result of the biometric image taken by the living body imaging unit 111 and the authentication image pre-registered in the storage unit 116. Since the authentication process is a well-known technical concept, detailed descriptions thereof will be omitted.

As described thus far, according to one embodiment of the present disclosure, the output characteristics of a biometric image are adaptively controlled depending on whether an imaging environment for a living body to be authenticated satisfies a predetermined recognition condition. This enables an authentication target user to easily adjust an imaging environment such as a distance to a camera or the like in conformity with a predetermined recognition condition while confirming an output situation of a biometric image.

Accordingly, in one embodiment of the present disclosure, the variation width of the change rate of the size of the face, the in-focus degree and the image brightness is adjusted according to the change of the distance between the user and the camera. This enables the user to naturally and visually recognize a biometric distance and to rapidly move to a predetermined recognition distance.

What is claimed is:

1. A biometric image output control method performed by a biometric authentication device including an imaging device, a display device and a processor, the method comprising:

obtaining a biometric image by imaging a body of a user through the imaging device, determining a separation distance from the imaging device to the body of the user through the imaging device;

controlling, by the processor, at least one of: a size of the biometric image, a focal point of the biometric image, and brightness of the biometric image according to the separation distance in order to display a controlled biometric image, wherein the controlling of the size of the biometric image is based on a first function related to the size of the biometric image with respect to the separation distance, wherein the first function is defined such that an obtained result of an absolute value of a ratio of a change of the size versus a change of the separation distance which is taken within a predetermined distance range, being smaller than an obtained result of an absolute value of a ratio of a change of the size versus a change of the separation distance which is taken outside the predetermined distance range, wherein the controlling of the focal point of the biometric image is based on a second function related to the focal point with respect to the separation distance, wherein the second function is defined such that an obtained result of an absolute value of a ratio of a change of the focal point versus a change of the separation distance which is taken within the predetermined distance range, being smaller than an obtained result of an absolute value of a ratio of a change of the focal point versus a change of the separation distance which is taken outside the predetermined distance range, and wherein the controlling of the brightness of the biometric image is based on a third function related to the brightness with respect to the separation distance wherein the third function is defined such that an obtained result of an absolute value of a ratio of a change of the brightness versus a change of the separation distance which is taken within the predetermined distance range, being smaller than an obtained result of an absolute value of a ratio of a change of the brightness versus a change of the separation distance which is taken outside the predetermined distance range matching the controlled biometric image to an authentication image pre-registered in a storage unit.

2. The method of claim 1, wherein the size of the biometric image is controlled depending on the separation distance.

3. The method of claim 1, wherein the focal point of the biometric image is controlled depending on the separation distance.

4. The method of claim 1, wherein the brightness of the biometric image is controlled depending on the separation distance.

5. A biometric authentication device, comprising:
- an imaging device configured to obtain a biometric image by imaging a body of a user and determine a separation distance from the imaging device to the body of the user;
- a display device; and
- an output control unit configured to:
- control at least one of: a size of the biometric image, a focal point of the biometric image, and brightness of the biometric image according to the separation distance in order to display the biometric image,
- wherein the controlling of the size of the biometric image is based on a first function related to the size of the biometric image with respect to the separation distance, wherein the first function is defined such that an obtained result of an absolute value of a ratio of a change of the size versus a change of the separation distance which is taken within a predetermined distance range, being smaller than an obtained result of an absolute value of a ratio of a change of the size versus a change of the separation distance which is taken outside the predetermined distance range,
- wherein the controlling of the focal point of the biometric image is based on a second function related to the focal point with respect to the separation distance, wherein the second function is defined such that an obtained result of an absolute value of a ratio of a change of the focal point versus a change of the separation distance which is taken within the predetermined distance range, being smaller than an obtained result of an absolute value of a ratio of a change of the focal point versus a change of the separation distance which is taken outside the predetermined distance range,
- wherein the controlling of the brightness of the biometric image is based on a third function related to the brightness with respect to the separation distance wherein the third function is defined such that an obtained result of an absolute value of a ratio of a change of the brightness versus a change of the separation distance which is taken within the predetermined distance range, being smaller than an obtained result of an absolute value of a ratio of a change of the brightness versus a change of the separation distance which is taken outside the predetermined distance range, and
- wherein the display unit is configured to display the controlled biometric image for matching the controlled biometric image to an authentication image pre-registered in a storage unit.

6. The device of claim 5, wherein the output control unit controls the size of the biometric image depending on the separation distance.

7. The device of claim 5, wherein the output control unit controls the focal point of the biometric image depending on the separation distance.

8. The device of claim 5, wherein the output control unit controls the brightness of the biometric image depending on the separation distance.

* * * * *